US008184567B2

(12) United States Patent
Huang et al.

(10) Patent No.: US 8,184,567 B2
(45) Date of Patent: May 22, 2012

(54) COMMUNICATIONS DEVICE CAPABLE OF ADJUSTING POWER CONSUMED THEREBY AND METHOD THEREOF, AND ETHERNET COMMUNICATIONS DEVICE

(75) Inventors: Liang-wei Huang, Taipei (TW);
Chun-Wen Yeh, Taipei County (TW);
Chien-Sheng Lee, Miaoli County (TW);
Tsung-Cheng Lee, Yunlin County (TW)

(73) Assignee: Realtek Semiconductor Corp., Hsinchu (TW)

( * ) Notice: Subject to any disclaimer, the term of this patent is extended or adjusted under 35 U.S.C. 154(b) by 221 days.

(21) Appl. No.: 12/574,981

(22) Filed: Oct. 7, 2009

(65) Prior Publication Data
US 2010/0091640 A1 Apr. 15, 2010

(30) Foreign Application Priority Data
Oct. 9, 2008 (TW) .............................. 97138904 A

(51) Int. Cl.
*H04B 7/00* (2006.01)

(52) U.S. Cl. ....................... 370/311; 370/252; 455/343.2

(58) Field of Classification Search .................. 370/252, 370/253, 311; 455/343.1–343.6
See application file for complete search history.

(56) References Cited

U.S. PATENT DOCUMENTS

| 2006/0172722 A1* | 8/2006 | Christensen et al. .......... 455/410 |
| 2008/0225841 A1* | 9/2008 | Conway et al. ................ 370/389 |
| 2009/0125735 A1* | 5/2009 | Zimmerman ................. 370/503 |

FOREIGN PATENT DOCUMENTS

CN 101222393 A 7/2008

OTHER PUBLICATIONS

English Abstract for CN 101222393A (Jul. 16, 2008).

\* cited by examiner

*Primary Examiner* — Pao Sinkantarakorn
(74) *Attorney, Agent, or Firm* — Thomas, Kayden, Horstemeyer & Risley, LLP

(57) ABSTRACT

A communications device is capable of adjusting power consumed thereby and includes a receiver and a control circuit. The receiver includes an analog-to-digital converter and a decoding circuit. The analog-to-digital converter receives receive-data from another communications device, converts the receive-data into a digital signal, and provides the digital signal to the decoding circuit for decoding. Based on the digital signal, the control circuit obtains a signaling index that indicates a communications quality of the receiver. The control circuit determines an operating state of the analog-to-digital converter and the decoding circuit in accordance with the signaling index and a receiving index. When the signaling index conforms with a reference range, the control circuit reduces a reference signal so as to reduce linearity of the analog-to-digital converter in accordance with the receiving index, and reduces a decoding capability of the decoding circuit in accordance with the receiving index.

26 Claims, 6 Drawing Sheets

US 8,184,567 B2

COMMUNICATIONS DEVICE CAPABLE OF ADJUSTING POWER CONSUMED THEREBY AND METHOD THEREOF, AND ETHERNET COMMUNICATIONS DEVICE

CROSS-REFERENCE TO RELATED APPLICATION

This application claims priority of Taiwanese application no. 097138904, filed on Oct. 9, 2008.

BACKGROUND OF THE INVENTION

1. Field of the Invention

This invention relates to a technology for reducing power consumption, more particularly to a communications device capable of adjusting power consumed thereby and a method thereof.

2. Description of the Related Art

In order to comply with specifications of high-speed communications devices and to be adapted for various channel factors, circuit design of a communications device is generally realized so as to meet the strictest of standards. For instance, it is preferred to increase linearity of an analog-to-digital converter or to increase a decoding capability of a decoding circuit so as to adjust for various channel factors by a comfortable margin. However, meeting such strict standards also demands high power consumption by circuits.

SUMMARY OF THE INVENTION

Therefore, an object of the present invention is to provide a communications device capable of adjusting power consumed thereby and a method thereof capable of reducing power consumption while meeting communications standards.

According to the present invention, there is provided a communications device capable of adjusting power consumed thereby and adapted for receiving receive-data from another communications device. The communications device comprises a receiver and a control circuit. The receiver includes an analog-to-digital converter and a decoding circuit. The analog-to-digital converter is adapted for receiving the receive-data and converting the receive-data into a digital signal. The decoding circuit is coupled to the analog-to-digital converter for decoding the digital signal. The control circuit is coupled to the receiver for obtaining a signaling index based on the digital signal. The signaling index indicates a communications quality of the receiver. The control circuit determines an operating state of the analog-to-digital converter and the decoding circuit in accordance with the signaling index and a receiving index. When the control circuit determines that the signaling index conforms with a reference range, the control circuit reduces a reference signal so as to reduce linearity of the analog-to-digital converter in accordance with the receiving index, and reduces a decoding capability of the decoding circuit in accordance with the receiving index.

According to another aspect of the present invention, there is provided a communications method capable of improving quality of a communications connection and adapted for a communications device that receives receive-data from another communications device, and that has a receiver including an analog-to-digital converter and a decoding circuit. The communications method comprises the steps of:

providing a receiving index;
converting the receive-data into a digital signal using the analog-to-digital converter, and decoding the digital signal using the decoding circuit;
computing a signaling index based on the digital signal;
determining an operating state of the analog-to-digital converter and the decoding circuit based on the receiving index and the signaling index; and
when it is determined that the signaling index conforms with a reference range, decreasing a reference signal for reducing linearity of the analog-to-digital converter in accordance with the receiving index, and reducing a decoding capability of the decoding circuit in accordance with the receiving index.

According to yet another aspect of the present invention, there is provided an Ethernet communications device capable of reducing power consumed thereby and adapted for transmitting a transmit-data and receiving a receive-data. The Ethernet communications device comprises a transmitter for transmitting the transmit-data, a receiver for receiving the receive-data, and a power adjusting control circuit coupled to the transmitter and the receiver for determining whether at least one of the transmit-data and the receive-data conforms with an Ethernet communications protocol for idle data. When the power adjusting control circuit determines that the at least one of the transmit-data and the receive-data conforms with the Ethernet communications protocol for idle data, the power adjusting control circuit reduces power consumed by at least one of the transmitter and the receiver correspondingly. Moreover, the power adjusting control circuit may be configured to determine whether an importance index or a length index of at least one of the transmit-data and the receive-data falls within a predetermined range.

BRIEF DESCRIPTION OF THE DRAWINGS

Other features and advantages of the present invent ion will become apparent in the following detailed description of the preferred embodiment with reference to the accompanying drawings, of which.

DETAILED DESCRIPTION OF THE PREFERRED EMBODIMENT

Generally, communications devices 100, 100A exchange packet data through a transmission media. During a period when no packet data is exchanged, an idle data is sent in order to maintain a communications link. Since a signal-to-noise ratio (SNR) that the communications devices 100,100A are capable of tolerating varies in accordance with content of data exchanged, there is no need to maintain a same communications quality over the length of a data exchange process.

This invention takes advantage of the above-described characteristic, utilizing the content of data exchanged as a basis for dynamically adjusting an operating state of the communications device 100 so as to comply with communications standards while minimizing power consumption, thereby ensuring effective data exchange between the communications devices 100,100A.

Figure 1:
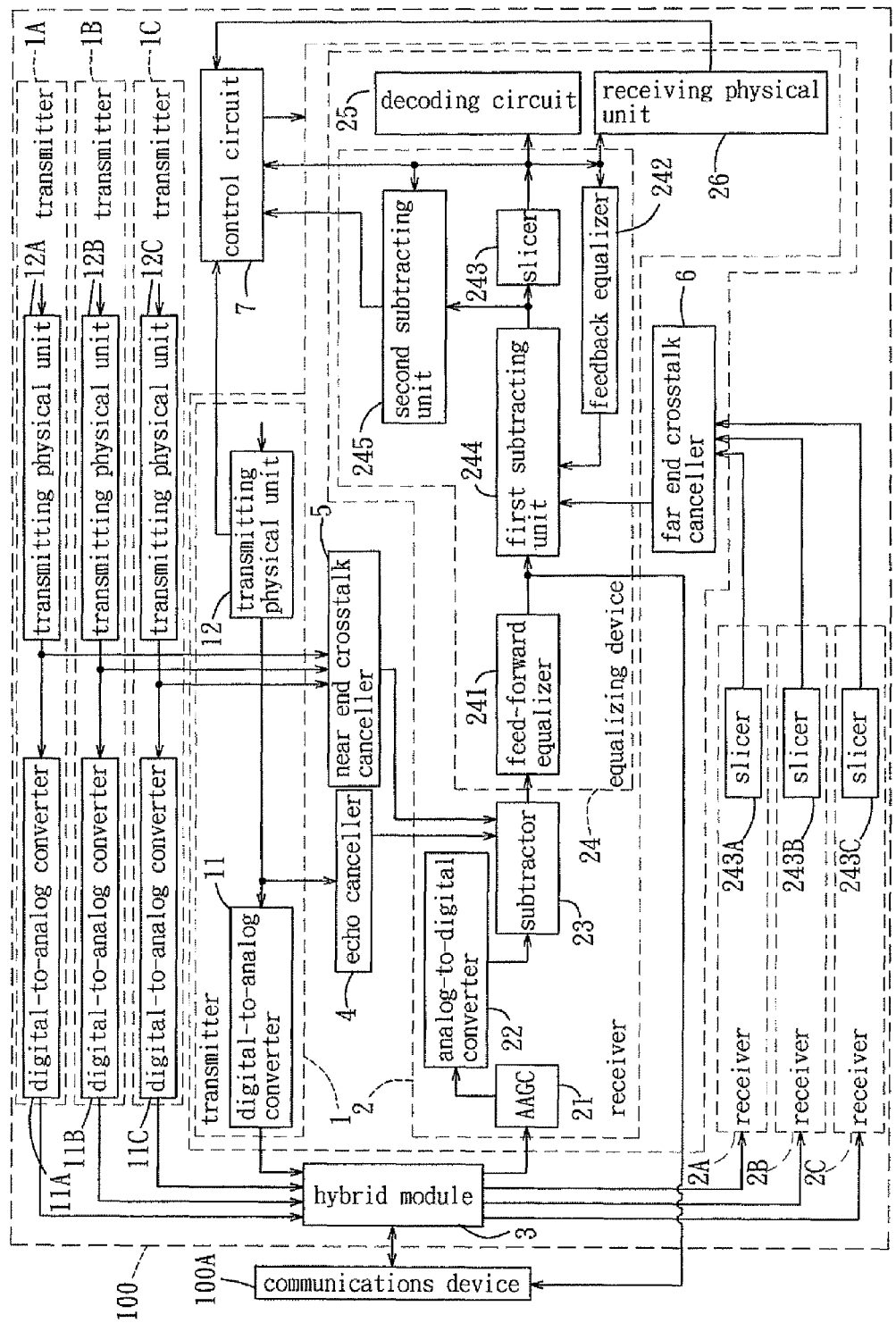
FIG. 1 is a schematic system block diagram of the preferred embodiment of a communications device capable of adjusting power consumed thereby according to the present invention.

FIG. 1 illustrates the preferred embodiment of a communications device 100 capable of adjusting power consumed thereby according to the present invention. The communications device 100 is adapted for transmitting transmit-data to another communications device 100A and receiving receive-data from the another communications device 100A. In this embodiment, the transmit-data and the receive-data exchanged between the communications devices 100,100A are network data that are either packet data or idle data.

In this embodiment, the communications device 100 includes a plurality of transmitters 1, 1A, 1B, 1C, a plurality of receivers 2, 2A, 2B, 2C, a hybrid module 3 coupled to the receivers 2, 2A, 2B, 2C and to the transmitters 1, 1A, 1B, 1C, an echo canceller 4 coupled to one of the transmitters 1, a near end crosstalk (NEXT) canceller 5 coupled to others of the transmitters 1A, 1B, 10, a far end crosstalk (FEXT) canceller 6 coupled to the receivers 2A, 2B, 2C, and a control circuit 7 coupled to another of the receivers 2 and the one of the transmitters 1.

Each of the transmitters 1, 1A, 1B, 10 includes a digital-to-analog converter (DAC) 11, 11A, 11B, 110 and a transmitting physical unit 12, 12A, 12B, 12C coupled to the DAC 11, 11A, 11B, 11C. In this embodiment, the transmitting physical units 12, 12A, 128, 12C are physical coding sub-layers (PCS).

The another of the receivers 2 includes an analog automatic gain controller (AAGC) 21, an analog-to-digital converter (ADC) 22 coupled to the AAGC 21, a subtractor 23 coupled to the ADC 22, the echo canceller 4 and the NEXT canceller 5, an equalizing device 24 coupled to the subtractor 23 and the FEXT canceller 6, a decoding circuit 25 coupled to the equalizing device 24, and a receiving physical unit 26 coupled to the equalizing device 24. In this embodiment, the receiving physical unit 26 is a physical coding sub-layer (PCS). The equalizing device 24 includes a feed-forward equalizer 241, a first subtracting unit 244 coupled to the feed-forward equalizer 241 and the FEXT canceller 6, a second subtracting unit 245 coupled to the first subtracting unit 244, a slicer 243 coupled to the first subtracting unit 244 and the second subtracting unit 245, and a feedback equalizer 242 coupled to the slicer 243 and the first subtracting unit 244. Each of the receivers 2A,2B,2C includes a slicer 243A,243B,243C.

Each of the transmitters 1, 1A, 1B, 1C generates a source signal in digital form, and the source signal is converted into transmit-data in analog form by the DAC 11, 11A, 11B, 11C and is then sent to the hybrid module 3 for subsequent transmission to the another communications device 100A as network data. The echo canceller 4 receives the source signal from the transmitting physical unit 12 of the one of the transmitters 1 for performing computation of a plurality of taps so as to output an echo canceling signal in accordance with the source signal. The NEXT canceller 5 receives the source signals from the transmitting physical units 12A,12B,12C of the others of the transmitters 1A,1B,1C and performs computation of a plurality of taps so as to output a near end canceling signal in accordance with the source signals.

The hybrid module 3 extracts a plurality of the receive-data from the network data from the another communications device 100A. The AAGC 21 receives one of the receive-data from the hybrid module 3 and performs automatic gain adjustment thereon, and the ADC 22 then converts the adjusted signal into a digital signal. The subtractor 23 subtracts the echo canceling signal and the near end canceling signal from the digital signal so as to generate an output. At the same time, others of the receive-data are received by the receivers 2A, 2B, 2C. The FEXT canceller 6 is controlled by the slicers 243A, 243B, 2430 of the receivers 2A, 2B, 2C to perform computation of a plurality of taps so as to generate a far end canceling signal. The equalizing device 24, in accordance with the output from the subtractor 23 and the far end canceling signal, outputs an equalized output for subsequent decoding by the decoding circuit 25 and conversion through the receiving physical unit 26.

The equalizing device 24 generates the equalized output as described below. The feed-forward equalizer 241 receives the output from the subtractor 23 and performs feed-forward equalization processing so as to generate a feed-forward signal accordingly. The first subtracting unit 244 subtracts the far end canceling signal and the output from the feedback equalizer 242 from the feed-forward signal so as to generate an output. The slicer 243 receives the output from the first subtracting unit 244 and extracts an equalized signal. The feedback equalizer 242 performs feedback equalization processing on the equalized signal so as to generate an output that is provided to the first subtracting unit 244. The feedback/feed-forward equalization processes include performing computation of a plurality of taps, and are techniques well known to those skilled in the art. Therefore, the equalization processes will not be further detailed herein.

In order to conduct data exchange utilizing minimal power consumption, the communications device 100 performs a communications method for obtaining a signaling index based on the digital signal that indicates a current communications quality of the receiver 2.

In this embodiment, the signaling index is the signal-to-noise ratio of the equalizing device 24, which is obtained by the control circuit 7 as follows: the second subtracting unit 245 computes a difference between the output from the first subtracting unit 244 and the equalized signal extracted from the output by the slicer 243; and the control circuit 7 then obtains the signal-to-noise ratio of the equalizing device 24 based on the computed difference and the equalized signal.

The communications device 100 performs another communications method for controlling the control circuit 7 through a mode selection command to determine a transmitting/receiving index associated with the content of data exchanged between the communications devices 100,100A. The communications device 100 uses the transmitting/receiving index together with the signaling index, which in this embodiment is the signal-to-noise ratio, for determining adjustment of an operating state of an analog circuit or a digital circuit of the communications device 100. With the adjustment of the operating state, power consumption of the communications device 100 can be reduced.

The analog circuits that are subject to adjustment of the operating state thereof are the DAC 11 and the ADC 22, and the digital circuits that are subject to adjustment are the echo canceller 4, the NEXT canceller 5, the FEXT canceller 6, the feed-forward equalizer, the feedback equalizer 242, and the decoding circuit 25.

The aforesaid mode selection commands are stored in a storage unit (not shown) coupled to the control circuit 7, and include the following: 'data form', 'packet importance', and 'packet length'.

When the mode selection command is 'data form', the control circuit 7 determines a transmitting state index and a receiving state index. The transmitting state index indicates that the transmit-data from the transmitter 1 is one of packet data and idle data, whereas the receiving state index indicates that the receive-data from the receiver 2 is one of packet data and idle data. When the transmit/receive-data is packet data, the corresponding state index is high. When the transmit/receive-data is idle data, the corresponding state index is low.

When the mode selection command is 'packet importance', the control circuit 7 determines a transmitting importance index and a receiving importance index. For instance, if the transmit/receive-data form passwords of an online banking institution for which no errors are permitted, the corresponding importance index is high. If the transmit/receive-data is ordinary video data, the corresponding importance index is low.

When the mode selection command is 'packet length', the control circuit 7 determines a transmitting length index and a receiving length index. Frequency of packet transmission/reception errors increases with packet length. As packet length of the transmit/receive-data increases, so does the corresponding length index. As packet length of the transmit/receive-data decreases, so does the corresponding packet length index.

It should be noted that each index can be subdivided into multiple grades. A greater grade value of the index means a higher requirement for communications quality. The indices may be provided by a computer system having a built-in communications device 100 or by the communications device 100 itself. For instance, the transmitting state index and the transmitting length index are provided by the transmitting physical unit 12, whereas the receiving state index and the receiving length index are provided by the receiving physical unit 26.

In the following description of this embodiment, the transmitting index refers in general to any one of the transmitting indices, i.e. the transmitting state index, the transmitting importance index, and the transmitting length index. Likewise, the receiving index refers in general to any one of the receiving indices, i.e., the receiving state index, the receiving importance index, and the receiving length index. In addition, it should be noted that for each mode selection command, the transmitting index determined in response reflects only characteristics of the transmit-data transmitted by the transmitter 1, and the receiving index determined in response reflects only characteristics of the receive-data received by the receiver 2. Therefore, the relationship between the transmitting index and the receiving index is not necessarily one of parity.

When packet data is exchanged between the communications devices 100, 100A, increased power consumption is often needed to promote communications quality and to ensure effective data exchange. However, when the transmitting/receiving indices are low, the communications devices 100,100A are able to tolerate comparatively poor signal-to-noise ratios. Consequently, there is no need to maintain the communications quality; a communications quality for sustaining the communications link between the communications devices 100,100A is sufficient.

Therefore, when the transmitting index is low, power consumption of the transmitter 1 can be reduced. That is, the control circuit 7 can decrease a reference voltage so as to reduce a transmitting power of the DAC 11 in accordance with the transmitting index, and can lower a reference current so as to reduce the linearity of the DAC 11 in accordance with the transmitting index.

Likewise, when the receiving index is low, power consumption of the receiver 2, the echo canceller 4, the NEXT canceller 5, and the FEXT canceller 6 can be reduced. That is, the control circuit 7 can decrease a reference signal that is one of a reference current and a reference voltage so as to reduce the linearity of the ADC 22 in accordance with the receiving index, decrease the decoding capability of the decoding circuit 25 so as to reduce power consumption in accordance with the receiving index, and reduce the number of taps of the equalizers 241, 242 and the cancellers 4,5,6 so as to reduce power consumption in accordance with the receiving index.

It should be noted that, after an adjustment of the number of taps, it is necessary to update associated coefficients. In another embodiment, the control circuit 7 stops updating the associated coefficients of the feed-forward equalizer 241, the feedback equalizer 242, and the cancellers 4~6 so as to reduce power consumption of the receiver 2. In yet another embodiment, the control circuit 7 only stops updating the number of taps or the associated coefficients of the equalizers 241, 242 and the FEXT canceller 6 so as to reduce power consumption.

Naturally, if the control circuit 7 is operated so as to perform operations opposite to those described above, power consumption of the circuits is increased. That is, a reference voltage is increased so as to increase the transmitting power of the DAC 11, a reference current is increased so as to increase the linearity of the DAC 11, a reference signal is increased so as to increase the linearity of the ADC 22, the decoding capability of the decoding circuit 25 is increased thus increasing power consumption of the decoding circuit 25, and the number of taps of the equalizers 241, 242 and the cancellers 4~6 is increased thus increasing power consumption thereof.

Moreover, the following techniques relevant to this invention should be well known to those skilled in the art: for the decoding circuit 25 of a Viterbi decoder, the decoding capability can be increased by increasing the length of trace back; for the decoding circuit 25 of a low density parity check (LDDC) decoder, the decoding capability can be raised by increasing the number of iterations; and for the equalizers 241, 242 and the cancellers 4~6, a least mean square (LMS) method and a recursive least square (RLS) method can be used for updating the coefficients and changing the number of taps.

Figure 2:
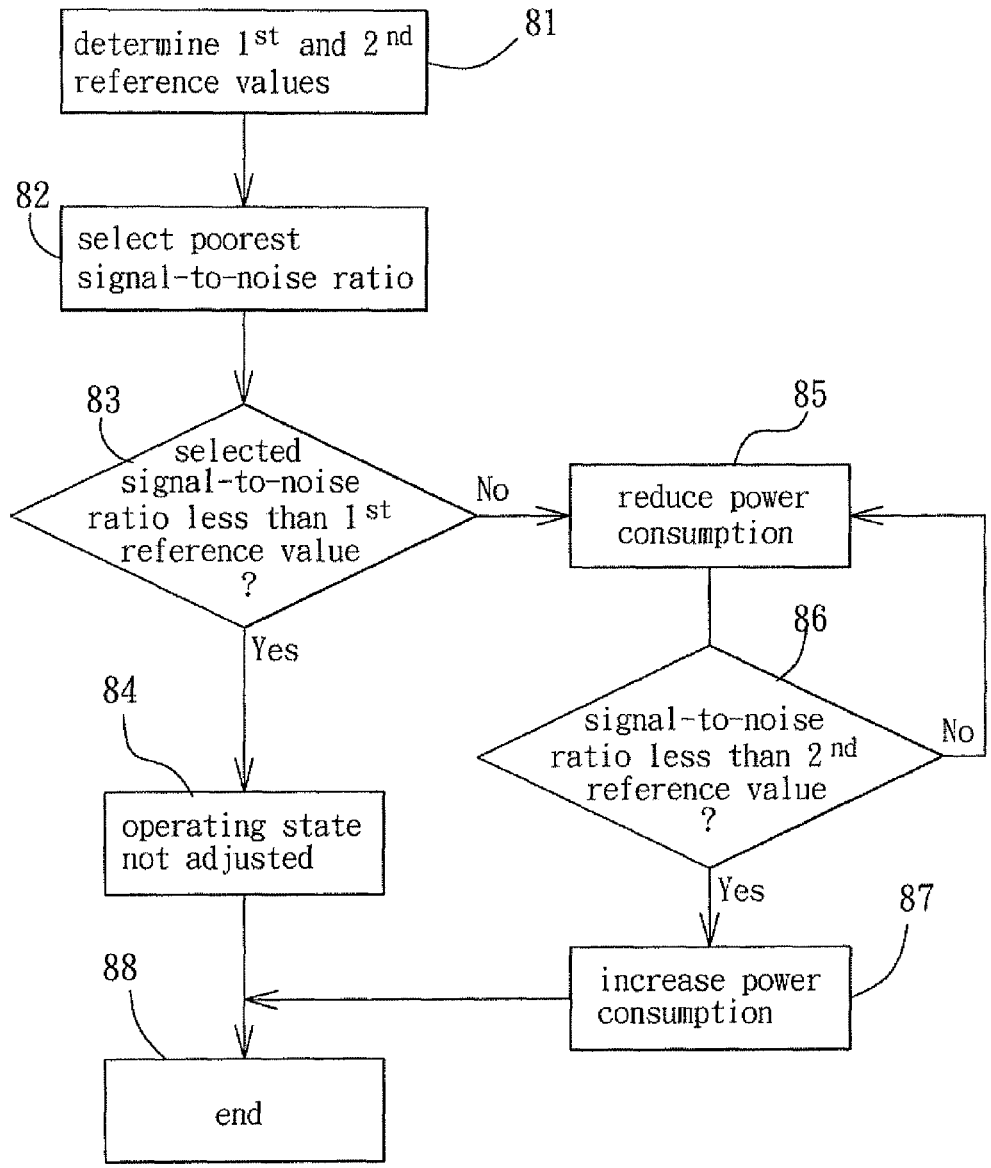
FIG. 2 is a flowchart to illustrate a preferred embodiment of a method for adjusting power consumption according to the present invention.

Referring to FIG. 2, the method for adjusting power consumption of the communications device 100 as performed by the control circuit 7 comprises the following steps:

In step 81, the control circuit 7 determines a first reference value and a second reference value that is higher than the first reference value according to a required communications quality. The required communications quality is determined by the control circuit 7 based on the transmitting/receiving index.

In this embodiment, the relationship between the first and second reference values and the transmitting/receiving index is predetermined. In other words, when the value of the transmitting/receiving index is determined, so are the corresponding first and second reference values. The predetermined relationship can be realized through but is not limited to a look-up table. Moreover, in this embodiment, the value of the first reference value increases as the required communications quality determined based on the transmitting/receiving index increases.

In step 82, the signal-to-noise ratios of the receivers 2, 2A, 23, 2C are obtained in accordance with the previously described method for obtaining the signal-to-noise ratio, and a poorest one is selected from among the signal-to-noise ratios obtained.

In step 83, it is determined whether the selected signal-to-noise ratio is less than the first reference value. That is, it is determined whether the selected signal-to-noise ratio does not conform with a reference range. If it is determined that the selected signal-to-noise ratio is less than the first reference value, the flow proceeds to step 84. Otherwise, the flow proceeds to step 85.

In step 84, since it has been determined in step 83 that the selected signal-to-noise ratio is less than the first reference value, indicating that none of the analog and digital circuits has too high an operating state, the operating state is not adjusted, and the flow proceeds to step 88.

In step 85, since it has been determined in step 83 that the selected signal-to-noise ratio is not lower than the first reference value, indicating that each of the analog and digital circuits can meet the required communication quality or reach a predetermined efficiency in a current operating state, the operating state can be adjusted so as to reduce power consumption. A measure of adjustment is either determined by a difference between the selected signal-to-noise ratio and the first reference value or is based on a fixed value.

In step 86, it is determined whether the selected signal-to-noise ratio is lower than the second reference value. When it is determined that the selected signal-to-noise ratio is lower than the second reference value, the flow proceeds to step 87. Otherwise, the flow goes back to step 85.

In step 87, since it has been determined in step 86 that the selected signal-to-noise ratio is lower than the second reference value, indicating that although under the current operating state each circuit can meet the required communication quality, efficiency under the current operating state cannot effectively ensure the communications quality, making it necessary to adjust the operating state so as to increase power consumption. A measure of adjustment is either determined by a difference between the selected signal-to-noise ratio and the second reference value or is based on a fixed value.

In step 88, the flow ends.

In this embodiment, when the mode selection command is 'packet importance' and the transmitting importance index is low, the control circuit 7 follows the previously described methods for determining the signal-to-noise ratio and adjusting the operating state so as to reduce power consumption of the transmitter 1, and when the receiving importance index is low, the control circuit follows the previously described methods for determining the signal-to-noise ratio and adjusting the operating state so as to reduce power consumption of the receiver 2 and the cancellers 4~6. However, in this embodiment, to avoid affecting the communications device 100 to so great an extent as to cause re-convergence of the coefficients of the FEXT canceller 6 and the equalizers 241, 242, the numbers of taps of the FEXT canceller 6 and the equalizers 241, 242 are not adjusted. Nevertheless, this should not be imposed as an implementation limitation of this invention.

When the mode selection command is 'packet length', to avoid wasted bandwidth due to packet retransmission caused by packet transmitting/receiving errors, the control circuit 7 adjusts the operating state so as to increase power consumption as the transmitting/receiving length index becomes high and adjusts the operating state so as to reduce power consumption as the transmitting/receiving length index becomes low. The numbers of taps of the FEXT canceller 6 and the equalizers 241, 242 are not changed.

It is worth noting that, although in this embodiment the signal-to-noise ratio is used as the basis for power adjustment, in practice, a bit error rate (BER) computed by the control circuit 7, or any other signaling index that is capable of representing the communications quality of the receiver 2 can be used. Moreover, nodes through which the control circuit 7 obtains the signal-to-noise ratio are not limited to what is disclosed herein. Any node that is capable of reflecting the current communications quality will suffice.

In addition, it should be noted that in this embodiment, the communications device 100 is an Ethernet communications device capable of adjusting power consumed thereby. The control circuit 7 is a power adjusting control circuit, and determines whether to adjust power consumed by at least one of the transmitter 1 and the receiver 2 in accordance with at least one of the following conditions: whether the transmit data/receive-data conform with the Ethernet communications protocol for idle data that conforms to an IEEE 802.3 standard; whether the importance index of the transmit/receive-data falls within a predetermined range; and whether the length index of the transmit/receive-data falls within a predetermined range.

After the control circuit 7 determines the characteristics of the transmit/receive-data, the control circuit 7 determines whether to adjust the power consumption of the communications device 100.

Figure 3:
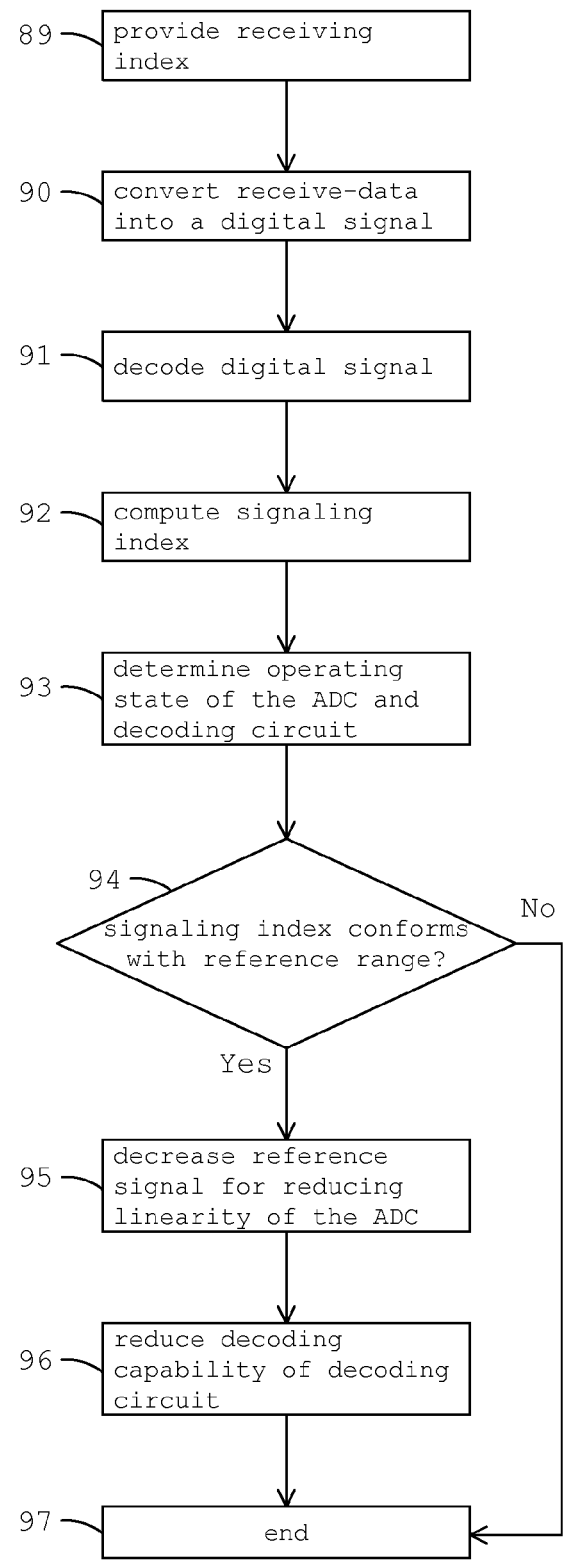
FIG. 3 is a flowchart illustrating a communication method in accordance with an embodiment of the invention.

Referring to FIG. 3, shown is a method for a communications method capable of improving quality of a communications connection. Beginning with step 89, a receiving index is provided. Next, as shown in step 90, receive-data is converted into a digital signal, which is decoded, as depicted in step 91. In step 92, the signaling index is computed. Next, in step 93, the operating state of the analog to digital converter and decoding circuit are determined. In step 94, it is determined whether the signaling index conforms with the reference range. If not, the method ends. Otherwise, as shown in step 95, the reference signal is decreased for reducing linearity of the analog to digital converter. Moving to step 96, the decoding capability of the decoding circuit is reduced. Thereafter, as shown in step 97, the method ends.

Figure 4:
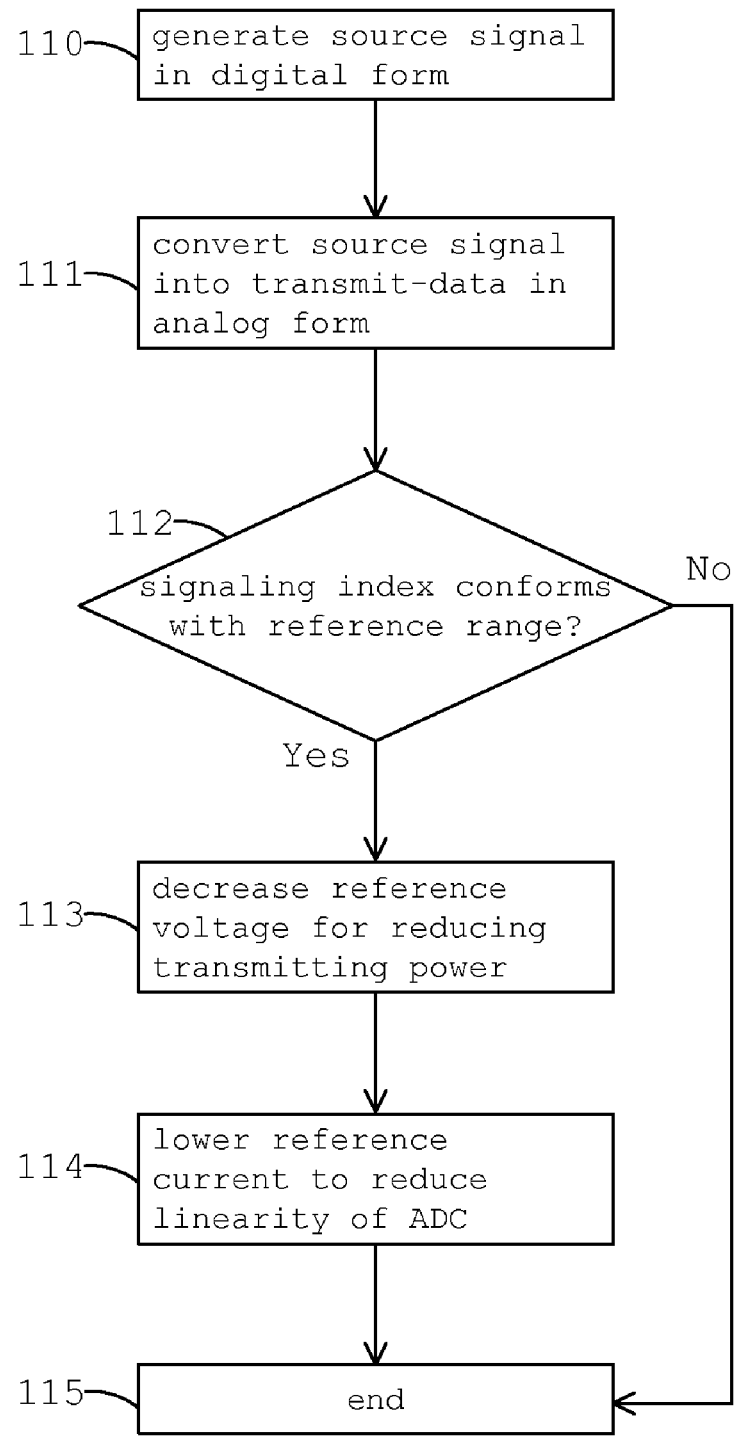
FIG. 4 is a flowchart illustrating a communication method in accordance with an embodiment of the invention.

Referring to FIG. 4, shown is a communications method capable of improving quality of a communications connection. Beginning with step 110, a source signal is generated in digital form and converted into transmit data in analog form, as shown in step 111. Next, as depicted in step 112, it is determined whether the signaling index conforms with the reference range. If not, the method ends. Otherwise, the method moves to step 113 and the reference voltage is decreased for reducing transmitting power. Next, as shown in step 114, the reference current is lowered to reduce linearity of the analog to digital controller. Thereafter, the method ends, as shown in step 115.

Figure 5:
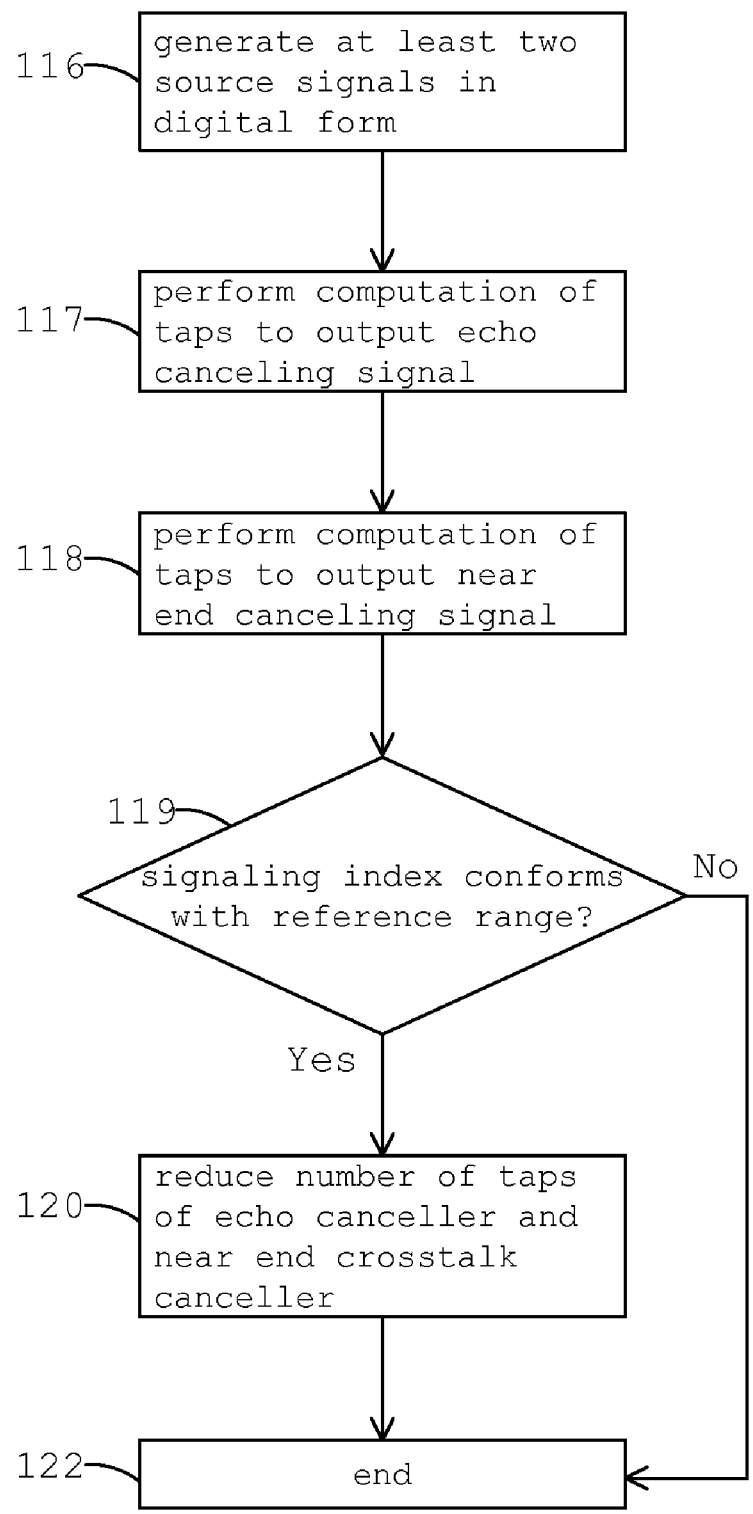
FIG. 5 is a flowchart illustrating a communication method in accordance with an embodiment of the invention.

Referring to FIG. 5, shown is a communications method capable of improving quality of a communications connection. Beginning with step 116, at least two source signals in digital form are generated. Next, in step 117, the computations of taps are performed to output an echo cancelling signal. Moving to step 118, computations of taps are performed to output near end cancelling signal. Then, it is determined whether the signaling index conforms with the reference range, as shown in step 119. If not, the method ends. Otherwise, the number of taps of the echo canceller and crosstalk canceller is reduced, as depicted in step 120. Thereafter, the method ends, as shown in step 122.

Figure 6:
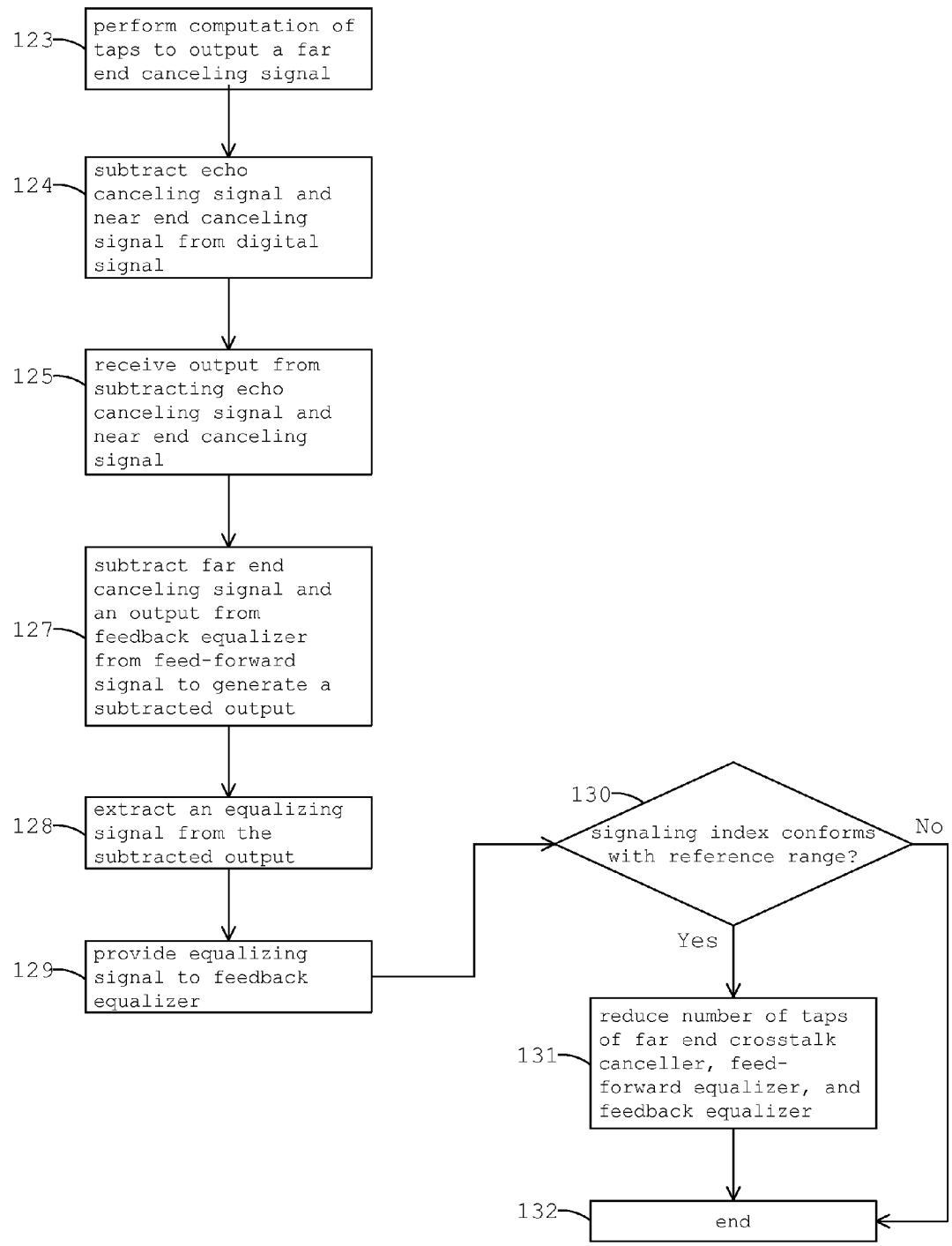
FIG. 6 is a flowchart illustrating a communication method in accordance with an embodiment of the invention.

Referring to FIG. 6, shown is a method capable of improving quality of a communications connection. Beginning with step 123, computations for taps to output a far end cancelling signal is performed. Then, as shown in step 124, the echo canceling signal is subtracted and the near end canceling signal are subtracted from the digital signal, and the output is received, as shown in step 125. Then, the far end canceling signal and an output from the feedback equalizer are subtracted from the feed-forward signal is subtracted, as shown in step 127. In step 128, an equalizing signal is extracted from the subtracted output. Next the equalizing signal is provided to the feedback equalizer, as shown in step 129. Next, in step 130, it is determined whether the signaling index conforms with the reference range. If not, the method ends. Otherwise, the number of taps for the far end crosstalk canceller, feed-forward equalizer, and feedback equalizer are reduced, as shown in step 131. Then, in step 132, the method ends.

In sum, the control circuit 7 of the communications device 100 determines the required communications quality according to the content of the network data, and then determines whether the signal-to-noise ratio meets the required communications quality so as to determine whether to adjust the operating state of each circuit dynamically. In this manner, this invention effectively reduces power consumption.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A communications device capable of adjusting power consumed thereby and adapted for receiving receive-data from another communications device, said communications device comprising:
    a receiver including
        an analog-to-digital converter adapted for receiving the receive-data and converting the receive-data into a digital signal, and
        a decoding circuit coupled to said analog-to-digital converter for decoding said digital signal; and
    a control circuit coupled to said receiver for obtaining a signaling index based on said digital signal, said signaling index indicating a communications quality of said receiver, said control circuit determining an operating state of said analog-to-digital converter and said decoding circuit in accordance with said signaling index and a receiving index;
    wherein in response to said control circuit determining that said signaling index conforms with a reference range, said control circuit reduces a reference signal so as to reduce linearity of said analog-to-digital converter in accordance with said receiving index, and reduces a decoding capability of said decoding circuit in accordance with said receiving index.

2. The communications device as claimed in claim 1, further comprising:
    a transmitter coupled to said control circuit, generating a source signal in digital form, and including a digital-to-analog converter for converting said source signal into transmit-data in analog form for subsequent transmission to the another communications device;
    wherein in response to said control circuit determining that said signaling index conforms with said reference range, said control circuit decreases a reference voltage so as to reduce a transmitting power of said digital-to-analog converter in accordance with a transmitting index, and decreases a reference current so as to reduce linearity of said digital-to-analog converter in accordance with said transmitting index.

3. The communications device as claimed in claim 2, wherein
    said transmitter further includes a transmitting physical unit, and said receiver further includes a receiving physical unit,
    said transmitting physical unit outputting said transmitting index for indicating that said transmit-data is one of packet data and idle data, said receiving physical unit outputting said receiving index for indicating that said receive-data is one of packet data and idle data.

4. The communications device as claimed in claim 2, wherein
    said transmitter further includes a transmitting physical unit, and said receiver further includes a receiving physical unit,
    said transmitting physical unit outputting said transmitting index for indicating an importance of packet data of said transmit-data, said receiving physical unit outputting said receiving index for indicating an importance of packet data of said receive-data.

5. The communications device as claimed in claim 2, wherein
    said transmitter further includes a transmitting physical unit, and said receiver further includes a receiving physical unit,
    said transmitting physical unit outputting said transmitting index for indicating a length of packet data of said transmit-data, said receiving physical unit outputting said receiving index for indicating a length of packet data of said receive-data.

6. The communications device as claimed in claim 1, further comprising:
    at least two transmitters, each generating a source signal in digital form;
    an echo canceller coupled to one of said at least two transmitters for receiving one of said source signals and performing computation of a plurality of taps so as to output an echo canceling signal in accordance with said one of said source signals; and
    a near end crosstalk canceller coupled to another of said at least two transmitters for receiving another of said source signals and performing computation of a plurality of taps so as to output a near end canceling signal in accordance with said another of said source signals;
    wherein in response to said control circuit determining that said signaling index conforms with said reference range, said control circuit reduces a number of taps of said echo canceller and said near end crosstalk canceller in accordance with said receiving index.

7. The communications device as claimed in claim 6, further comprising:
    a far end crosstalk canceller coupled to said receiver for receiving other receive-data from the another communications device and performing computation of a plurality of taps so as to output a far end canceling signal in accordance with the other receive-data;
    wherein said receiver further includes
        a subtractor coupled to said analog-to-digital converter, said echo canceller and said near end crosstalk canceller for subtracting said near end canceling signal and said echo canceling signal from said digital signal so as to generate an output, and
        an equalizing device coupled to said subtractor and said decoding circuit, and provided with a feed-forward equalizer, a feedback equalizer, a slicer, and a first subtracting unit,
            said feed-forward equalizer receiving the output from said subtractor and performing computation of a plurality of taps so as to generate a feed-forward signal accordingly, said first subtracting unit being coupled to said feed-forward equalizer and said far end crosstalk canceller for subtracting said far end canceling signal and an output from said feedback equalizer from said feed-forward signal so as to generate an output, said slicer being coupled to said first subtracting unit for receiving said output from said first subtracting unit and extracting an equalizing signal for output, said feedback equalizer being coupled to said slicer for receiving said equalizing signal and performing computation of a plurality of taps so as to generate said output that is provided to said first subtracting unit;

wherein in response to said control circuit determining that said signaling index conforms with said reference range, said control circuit reduces a number of taps of said far end crosstalk canceller, said feed-forward equalizer, and said feedback equalizer in accordance with said receiving index.

8. A communications method capable of improving quality of a communications connection and adapted for a communications device that receives receive-data from another communications device, and that has a receiver including an analog-to-digital converter and a decoding circuit, said communications method comprising the steps of:

providing a receiving index;

converting the receive-data into a digital signal using the analog-to-digital converter, and decoding the digital signal using the decoding circuit;

computing a signaling index based on the digital signal;

determining an operating state of the analog-to-digital converter and the decoding circuit based on the receiving index and the signaling index; and in response to a determination that the signaling index conforms with a reference range, decreasing a reference signal for reducing linearity of the analog-to-digital converter in accordance with the receiving index, and reducing a decoding capability of the decoding circuit in accordance with the receiving index.

9. The communications method as claimed in claim 8, the communications device further having a transmitter including a digital-to-analog converter, said communications method further comprising the steps of:

generating a source signal in digital form using the transmitter;

converting the source signal into transmit-data in analog form using the digital-to-analog converter; and in response to a determination that the signaling index conforms with the reference range, decreasing a reference voltage for reducing a transmitting power of the digital-to-analog converter in accordance with a transmitting index, and lowering a reference current so as to reduce linearity of the digital-to-analog converter in accordance with the transmitting index.

10. The communications method as claimed in claim 9, wherein the transmitting index indicates that the transmit-data is one of packet data and idle data, and the receiving index indicates that the receive-data is one of packet data and idle data.

11. The communications method as claimed in claim 9, wherein the transmitting index indicates an importance of packet data of the transmit-data, and the receiving index indicates an importance of packet data of the receive-data.

12. The communications method as claimed in claim 9, wherein the transmitting index indicates a length of packet data of the transmit-data, and the receiving index indicates a length of packet data of the receive-data.

13. The communications method as claimed in claim 8, the communications device further including at least two transmitters, an echo canceller, and a near end crosstalk canceller, said communications method further comprising the steps of:

generating at least two source signals in digital form using the at least two transmitters;

performing computation of a plurality of taps so as to output an echo canceling signal in accordance with one of said at least two source signals using the echo canceller;

performing computation of a plurality of taps so as to output a near end canceling signal in accordance with another one of said at least two source signals using the near end crosstalk canceller; and in response to a determination that the signaling index conforms with the reference range, reducing a number of taps of the echo canceller and the near end crosstalk canceller in accordance with the receiving index.

14. The communications method as claimed in claim 13, the communications device further including a far end crosstalk canceller, the receiver being further provided with a feed-forward equalizer and a feedback equalizer, said communications method further comprising the steps of:

performing computation of a plurality of taps so as to output a far end canceling signal in accordance with other receive-data from the another communications device using the far end crosstalk canceller;

subtracting the echo canceling signal and the near end canceling signal from the digital signal for subsequent output;

receiving said output from the step of subtracting and performing computation of a plurality of taps for generating a feed-forward signal accordingly using the feed-forward equalizer;

subtracting the far end canceling signal and an output from the feedback equalizer from the feed-forward signal so as to generate a subtracted output;

extracting an equalizing signal from the subtracted output;

providing the equalizing signal to the feedback equalizer for performing computation of a plurality of taps and generating the output accordingly that is used in generating the subtracted output; and in response to a determination that the signaling index conforms with the reference range, reducing a number of taps of the far end crosstalk canceller, the feed-forward equalizer and the feedback equalizer in accordance with the receiving index.

15. An Ethernet communications device capable of reducing power consumed thereby and adapted for transmitting a transmit-data and receiving a receive-data, said Ethernet communications device comprising:

a transmitter for transmitting the transmit-data;

a receiver for receiving the receive-data, the receiver including a decoding circuit; and a power adjusting control circuit coupled to said transmitter and said receiver for determining whether at least one of the transmit-data and the receive-data conforms with an Ethernet communications protocol for idle data, and in response to said power adjusting control circuit determining that the at least one of the transmit-data and the receive-data conforms with the Ethernet communications protocol for idle data, said power adjusting control circuit reducing power consumed by at least one of said transmitter and said receiver correspondingly, and in response to said power adjusting control circuit determining that the receive data conforms with the Ethernet communications protocol for idle data, said power adjusting control circuit reduces power consumption of said decoding circuit of said receiver;

wherein said receiver includes at least one digital circuit, and in response to said power adjusting control circuit determining that the receive-data conforms with the Ethernet communications protocol for idle data, said power adjusting control circuit stops updating coefficients of said at least one digital circuit of said receiver so as to reduce power consumed by said receiver.

16. The Ethernet communications device as claimed in claim 15, wherein said transmitter includes an analog circuit, and in response to said power adjusting control circuit determining that the transmit-data conforms with the Ethernet communications protocol for idle data, said power adjusting control circuit reduces power consumed by said analog circuit of said transmitter.

17. The Ethernet communications device as claimed in claim 15, wherein said receiver includes at least one of an echo canceller and a near end crosstalk canceller, and in response to said power adjusting control circuit determining that the receive-data conforms with the Ethernet communications protocol for idle data, said power adjusting control circuit reduces a number of taps of said at least one of said near end crosstalk canceller and said echo canceller of said receiver so as to reduce power consumed by said receiver.

18. The Ethernet communications device as claimed in claim 15, wherein the Ethernet communications protocol conforms to an IEEE 802.3 standard.

19. An Ethernet communications device capable of reducing power consumed thereby and adapted for transmitting transmit-data and receiving receive-data, said Ethernet communications device comprising:
a transmitter for transmitting the transmit-data;
a receiver for receiving the receive-data; and
a power adjusting control circuit coupled to said transmitter and said receiver for determining whether a packet importance index of at least one of the transmit-data and the receive-data falls within a predetermined range, and in response to said power adjusting control circuit determining that said packet importance index of the at least one of the transmit-data and the receive-data falls within the predetermined range, said power adjusting control circuit reducing power consumed by at least one of said transmitter and said receiver correspondingly;
wherein said receiver includes at least one of an echo canceller and a near end crosstalk canceller, and in response to said power adjusting control circuit determining that said packet importance index of the receive-data falls within the predetermined range, said power adjusting control circuit reduces a number of taps of said at least one of said near end crosstalk canceller and said echo canceller so as to reduce power consumed by said receiver.

20. The Ethernet communications device as claimed in claim 19, wherein said transmitter includes an analog circuit, and in response to said power adjusting control circuit determining that said packet importance index of the transmit-data falls within the predetermined range, said power adjusting control circuit reduces power consumed by said analog circuit of said transmitter.

21. The Ethernet communications device as claimed in claim 19, wherein said receiver includes a decoding circuit, and in response to said power adjusting control circuit determining that said packet importance index of the receive-data falls within the predetermined range, said power adjusting control circuit reduces power consumed by said decoding circuit of said receiver.

22. The Ethernet communications device as claimed in claim 19, wherein said receiver includes at least one digital circuit, and in response to said power adjusting control circuit determining that said packet importance index of the receive-data falls within the predetermined range, said power adjusting control circuit stops updating coefficients of said at least one digital circuit of said receiver so as to reduce power consumed by said receiver.

23. An Ethernet communications device capable of adjusting power consumed thereby, and adapted for transmitting transmit-data and receiving receive-data, said Ethernet communications device comprising:
a transmitter for transmitting the transmit-data;
a receiver for receiving the receive-data; and
a power adjusting control circuit coupled to said transmitter and said receiver for determining whether a packet length index of at least one of the transmit-data and the receive-data falls within a predetermined range, and in response to said power adjusting control circuit determining that said packet length index of the at least one of the transmit-data and the receive-data falls within the predetermined range, said power adjusting control circuit reducing power consumed by at least one of said transmitter and said receiver correspondingly;
wherein said receiver includes at least one of an echo canceller and a near end crosstalk canceller, and in response to said power adjusting control circuit determining that said packet length index of the receive-data falls within the predetermined range, said power adjusting control circuit reduces a number of taps of said at least one of said near end crosstalk canceller and said echo canceller of said receiver so as to reduce power consumed by said receiver.

24. The Ethernet communications device as claimed in claim 23, wherein said transmitter includes an analog circuit, and in response to said power adjusting control circuit determining that said packet length index of the transmit-data falls within the predetermined range, said power adjusting control circuit reduces power consumed by said analog circuit of said transmitter.

25. The Ethernet communications device as claimed in claim 23, wherein said receiver includes a decoding circuit, and in response to said power adjusting control circuit determining that said packet length index of the receive-data falls within the predetermined range, said power adjusting control circuit reduces power consumed by said decoding circuit of said receiver.

26. The Ethernet communications device as claimed in claim 23, wherein said receiver includes at least one digital circuit, and in response to said power adjusting control circuit determining that said packet length index of the receive-data falls within the predetermined range, said power adjusting control circuit stops updating coefficients of said at least one digital circuit of said receiver so as to reduce power consumed by said receiver.

* * * * *